April 19, 1966 W. L. HYDE 3,246,507
METHOD AND APPARATUS FOR MEASURING INTRA-OCULAR PRESSURE
Original Filed Nov. 17, 1960 2 Sheets-Sheet 1

INVENTOR
WALTER LEWIS HYDE
BY
ATTORNEYS

United States Patent Office 3,246,507
Patented Apr. 19, 1966

3,246,507
METHOD AND APPARATUS FOR MEASURING INTRA-OCULAR PRESSURE
Walter Lewis Hyde, Pittsburgh, Pa., assignor to American Optical Company, Southbridge, Mass., a voluntary association of Massachusetts
Continuation of application Ser. No. 69,948, Nov. 17, 1960. This application Apr. 5, 1963, Ser. No. 271,016
20 Claims. (Cl. 73—80)

This application is a continuation of my copending application Serial No. 69,948, field November 17, 1960, and now abandoned.

The field of this invention is that of tonometry, and the invention relates, more particularly, to a novel and improved tonometer and to a novel and improved method to tonometry.

As is well known, the pathological eye disorder known as glaucoma is characterized by increasing intraocular pressure which can ultimately lead to destruction of the eye. When this disorder has developed into its more advanced stages, progressive deterioration of the eye is difficult or impossible to halt and usually results in total blindness in the eye so that detection if incipient glaucoma at the earliest possible moment is of the highest importance. At the present time, it is conventional practice to measure intraocular pressure or the tone of an eye as it is called for detecting incipient glaucoma as well as for other reasons, and various tonometers and methods of tonometry have been developed for this purpose. Known conventional tonometers utilize a rigid plunger member or members which directly engage and exert a pressure against the cornea of an eye with measured force for depressing the cornea against intraocular pressure and which measure the extent to which the cornea is depressed or indented as an indication of intraocular pressure. As will be readily understood, the pressing of a hard plunger against the cornea exposes the cornea to risk of injury, particularly where substantial depression of the cornea may be required.

It is an object of this invention to provide a novel and improved method of tonometry; to provide a method of tonometry by which intraocular pressure can be accurately measured without risk of injury to the cornea of the eye; to provide such a method of tonometry which does not require contact between the eye and any hard or unyielding object; to provide such a method of tonometry by which intraocular pressure can be accurately determined with minimum depression of the cornea; and to provide such a method of tonometry which can be rapidly and conventiently performed. It is a further object of this invention to provide a novel and improved tonometer; to provide a tonometer which can be utilized for measuring intraocular pressure without risk of injury to the cornea of an eye; to provide such a tonometer which does not require contact between an eye and any hard, unyielding object; to provide such a tonometer which can measure intraocular pressure with speed, convenience and accuracy; and to provide such a tonometer which is simply and inexpensively constructed.

Briefly described, the novel and improved method of tonometry provided by this invention includes the steps of establishing a plurality of fluid passages having respective open ends, projecting streams of fluid from respective passages through the open ends thereof with different forces so that at least one stream of fluid is projected with sufficient force to indent an eye, establishing a spatial relationship between the open passage ends and an eye so that the open passage ends are substantially restricted by the eye and so that the eye is indented by at least said one stream of fluid, and measuring or sensing fluid pressures within said passages as an indication of intraocular pressure.

A preferred method of tonometry provided by this invention includes the steps of establishing a plurality of fluid passage having respective open ends, and projecting streams of fluid from respective passages so that a stream of fluid is projected from at least one passage with sufficient force to indent an eye and so that a stream of fluid is projected from at least one other passage with less force than is required to indent an eye. For example, a pair of fluid passages can be established having respective open ends in side-by-side, concentric or other predetermined relation and a stream of fluid can be projected from one passage with an applied pressure greater than 60 millimeters of mercury so that the stream of fluid is adapted to indent an eye against the force of intraocular pressure even where intraocular pressure may be increased by a pathological disorder such a glaucoma. Where the open passage ends are disposed in concentric relation, this stream of fluid is preferably projected from the inner passage. A stream of fluid can be projected from the other passage with an applied pressure less than 10 millimeters of mercury so that the stream of fluid is adapted to be directed upon an eye without indenting the eye against the force of normal intraocular pressure. In this arrangement, the open passage ends can be positioned relative to an eye so that the eye substantially restricts the open passage ends, whereby fluid pressures within the passages will increase to approach the applied pressures by which said streams of fluid are projected. Where the passage ends are located relatively close to the eye, fluid pressure increases within the passages will be very closely related to the extent to which the open passage ends are restricted by the eye. Since the stream of fluid projected from said other passage is not adapted to indent or depress the eye, the fluid pressure in that passage indicates the extent to which the open end of the passage is restricted by the eye and will therefore be an extremely accurate measure of the spacing of the passage ends from the eye. On the other hand, since the stream of fluid projected from said one passage is adapted to indent or depress the eye, fluid pressure in that one passage will indicate greater spacing of the passage ends from a depressed portion of the eye and will therefore be a measure of the extent to which the eye is indented or depressed by the stream of fluid projected from that passage. As will be understood, the extent to which the eye is indented by a stream of fluid exerting a known force can comprise an indication of intraocular pressure. Most advantageously, the position of the passage ends relative to an eye can be adjusted until fluid pressure within said other passage is increased to a predetermined level for indicating that the passage ends are located in a predetermined, preferred position relative to the eye. Then fluid pressure in said one passage can be measured as an indication of intraocular pressure. Preferably, also, the fluid pressure within said one passage is measured automatically when fluid pressure in said other passage is increased to said predetermined level, whereby the passage ends need be maintained in the preferred position relative to the eye for a minimum period of time.

Alternatively, three fluid passages can be established having respective open ends disposed in side-by-side, linear relation. If desired, streams of fluid can be projected from respective passages so that the stream of fluid projected from the center passage has sufficient force to indent an eye and so that streams of fluid projected from the outer passages have less force than is required for indenting an eye. Conversely, if desired, a stream of fluid can be projected from the center passage with less force than is required for indenting an eye and the streams of fluid projected from the outer passages can be projected with said greater force. In this arrangement, the fluid pressure in the passage or passages from which fluid is projected with a relatively small applied pressure can indicate the position of the passage ends relative to the eye in the manner above described. The fluid pressures in the outer passages can be brought into balance whether the streams of fluid projected from said outer passages are projected with relatively low or relatively high pressure, thereby to assure that the passages are aligned with a radius of the cornea of the eye. Fluid pressures in the passage or passages from which streams of fluid are projected with relatively high pressures can then be measured or sensed as an indication of intraocular pressure as described above.

In a preferred method of tonometry according to this invention, there is provided a pliable protecting film which is placed in coextensive superposition upon the cornea of the eye prior to measurement of intraocular pressure in the manner above described, thereby to shield the eye from abrasive materials which might be carried in said streams of fluid and to prevent drying of the surface of the eye where said streams of fluid comprise streams of air and the like.

The novel and improved tonometer provided by this invention includes means having a plurality of passages therethrough, the passages having respective open ends which are preferably arranged in predetermined, closely-spaced relation to each other. For example, a pair of tube means having respective open ends can be mounted or secured together for holding the open tube ends in side-by-side, concentric or other predetermined relation. The tonometer also includes means projecting streams of fluid from respective passages through the open ends thereof so that at least one stream of fluid is projected with sufficient force to indent an eye and preferably so that at least one stream of fluid is projected with less force than is required for indenting an eye. Where the tonometer incorporates a pair of tube means having respective open ends in concentric relation, said means are preferably provided for projecting a stream of fluid from the inner passage end with sufficient force to indent an eye. The tonometer also includes pressure-responsive means for sensing or measuring fluid pressures within said passages as an indication of intraocular pressure.

In a practical embodiment of this invention, the tonometer includes three tube means having respective open ends, the tube means being mounted for holding the open tube ends in side-by-side linear relation to each other. Means are provided for projecting a stream of fluid from the center passage with sufficient force to indent an eye and means are provided for projecting streams of fluid from the outer passages with less force than is required for indenting an eye. Conversely, if desired, means are provided for projecting streams of fluid from the outer passages with sufficient force to indent an eye and means are provided for projecting a stream of fluid from the center passage with less force than is required for indenting an eye. This embodiment of the tonometer also incorporates pressure-responsive means for measuring or sensing fluid pressures within said passages as an indication of intraocular pressure.

In a preferred embodiment of this invention, the tonometer includes a pair of tube means having respective open ends, the tube means being mounted for holding said open tube ends in predetermined, closely-spaced relation. Means are provided for projecting a stream of fluid from one passage with sufficient force to indent an eye, and means are provided for projecting a stream of fluid from the other passage with less force than is required for indenting an eye. First manometer means incorporated in the tonometer includes a column of liquid movable in a manometer tube, the manometer tube being associated with said one tube means so that the liquid level in the tube is adapted to indicate fluid pressure within the one tube means. Electrically actuable valve means are disposed within the manometer tube and are adapted to fix the liquid level in the tube when actuated, thereby to maintain the liquid level in the tube as a record of fluid pressure within said one tube means at the time the valve means is actuated. Second manometer means are associated with the other tube means for measuring or sensing a predetermined fluid pressure within the other tube means, the second manometer means including means for closing an electrical circuit to actuate said valve means automatically when fluid pressure is sensed or measured by said second manometer means as having reached said predetermined level.

Preferably, the first manometer means includes means for detachably mounting a scale adjacent said manometer tube, and the tonometer includes a plurality of scales adapted to be selectively mounted adjacent said manometer tube. The scales each have divisions spaced to indicate intraocular pressures corresponding to liquid levels in the manometer tube for respective corneal curvatures. That is, the graduations of the scales are calibrated relative to respective eyes having particular corneal curvatures. The tonometer can then be positioned relative to an eye having a corneal curvature corresponding to that for which a particular scale has been calibrated for substantially restricting the open tube ends, thereby to increase fluid pressures within said tube means until said valve means are actuated for fixing the liquid level in said manometer tube. The liquid level in said manometer tube then indicates fluid pressure in said one tube means. By reading the graduation of a scale calibrated for said corneal curvature which has been selectively mounted adjacent the manometer tube, this fluid pressure measure can be interpreted as a corresponding measure of intraocular pressure for the eye.

Other objects, advantages and details of the tonometers and method of tonometry provided by this invention will appear in the following description of preferred embodiments of the invention, the description referring to the drawing in which.

Figure 1:
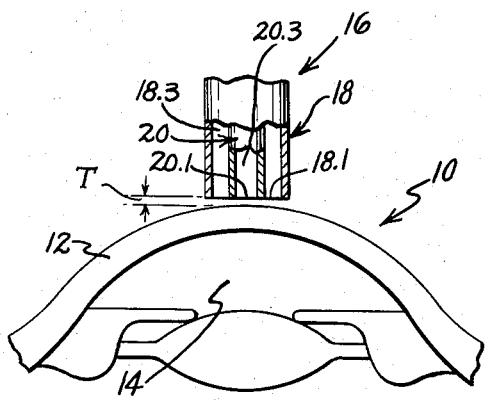
FIG. 1 is a partial side elevation view partially in section of the tonometer provided by this invention illustrating association of the tonometer with an eye for intraocular pressure.

Referring to the drawings, FIGS. 1–5 illustrate part of an eye 10 showing the relationship between the cornea 12 and the anterior chamber 14 of an eye. As can be seen, the cornea is disposed so that the fluid pressure of the aqueous humour which resides in the anterior chamber is exerted directly upon the cornea and holds the elastic corneal tissue in a distended condition as shown. In a normal eye, the fluid pressure within the eye, or the intraocular pressure as it is called, can range from 11.5 to 30 millimeters of mercury with most eyes having an intraocular pressure between 20 and 25 millimeters of mercury. However, in a diseased eye suffering the disorder known as glaucoma, intraocular pressure can increase to as much as 60 millimeters of mercury in acute stages of the disorder.

Figure 2:
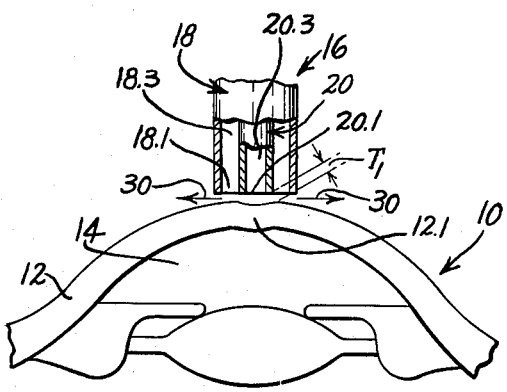
FIG. 2 is a view similar to FIG. 1 illustrating the function of the device of FIG. 1.
Figure 3:
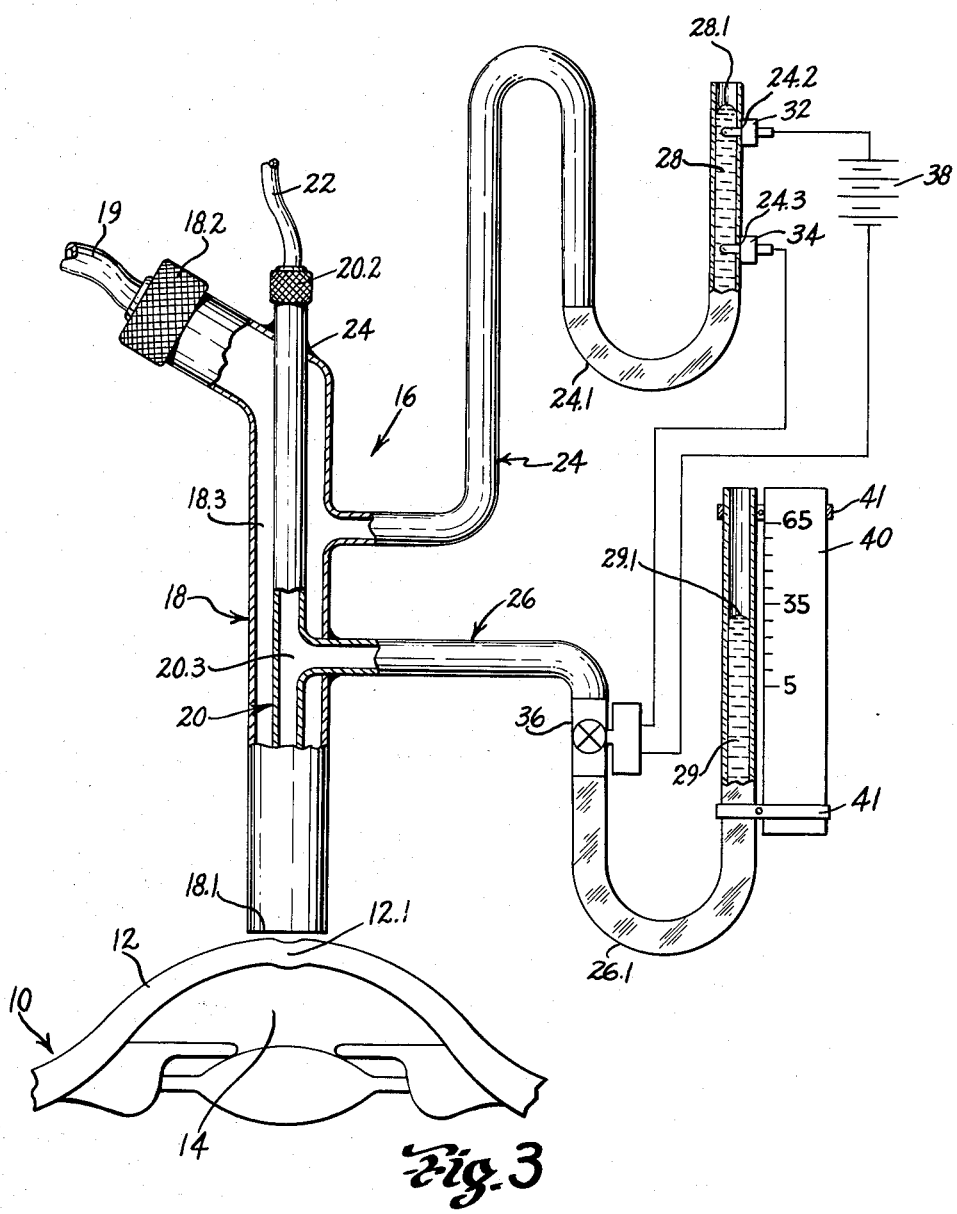
FIG. 3 is a view similar to FIG. 1 illustrating an alternative embodiment of the device of FIG. 1.

A preferred embodiment of the tonometer provided by this invention is indicated at 16 in FIGS. 1–3, the tonometer including a tube 18 having an open end 18.1 The tube 18 is connected as at 18.2 to a source of compressed air 19 so that a stream of compressed air is projected through the tube passage 18.3 from the open tube end 18.1. The source of compressed air can be of any conventional type but is preferably adapted to project a stream of air through the tube 18 with a maximum applied pressure of less than 10 millimeters of mercury. In such an arrangement, the fluid pressure within the open-ended passage 18.3 will normally be substantially less than 10 millimeters of mercury but, as will be understood, if the open end 18.1 of the tube is closed, fluid pressure within the tube passage will rise to equal the applied pressure.

The tonometer 16 also includes another tube 20 which has an open end 20.1, this tube being connected as at 20.2 to another source of compressed air 22. The tube 20 is mounted within the tube passage 18.3 so that the open tube ends 18.1 and 20.1 are arranged in fixed, concentric relation. For example, as illustrated, the tube 20 can be brazed, soldered or otherwise secured to the tube 18 as at 24 for holding the open tube ends in said predetermined, closely-spaced relation. The compressed air source 22 can also be of any conventional type but is preferably adapted to project a stream of air through the tube passage 20.3 with a minimum applied pressure greater than 60 millimeters of mercury. In this arrangement, fluid pressure within the tube passage 20.3 will normally be substantially less than 60 millimeters of mercury, but if the open tube end 20.1 is closed, fluid pressure within the tube passage will rise to equal the applied pressure. It should be understood that although streams of air are described herein, streams of any other suitable fluid such as distilled water or the like could be projected from the tubes 18 and 20 within the scope of this invention. The tubes 18 and 20 can be formed of metal, plastic or any other suitably strong and rigid material which has a reasonable degree of dimensional stability under various pressures.

Each of the tubes 18 and 20 is connected to a manometer tube, 24 and 26 respectively, each manometer tube having a goosenecked portion, 24.1 and 26.1 respectively, which is filled with a relatively heavy liquid 28 and 29 respectively in conventional manner. As will be readily understood, the manometer tubes are connected to the tubes 18 and 20 so that the columns of liquid 28 and 29 in the left-hand portions of the manometer tubes are exposed to fluid pressures within the passages 18.3 and 20.3. Thus, the columns of liquid, preferably columns of mercury, are adapted to rise and fall in the right-hand portions of the goosenecks 24.1 and 26.1 as fluid pressures in the passages 18.3 and 20.3 increase and decrease so that the levels 28.1 and 29.1 of the liquids 28 and 29 in the tubes 24 and 26 comprise a measure of the fluid pressures in the passages 18.3 and 20.3 respectively.

Figure 6:
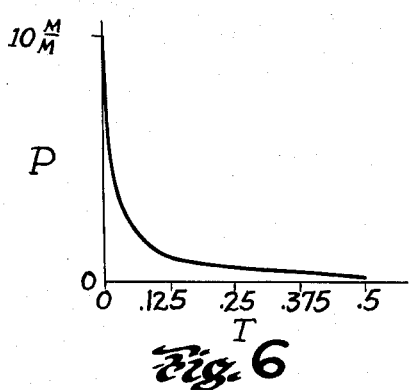
FIG. 6 is a graph representing the relationship between spacing of the tonometer from an eye and fluid pressures in the tonometer passages.

As shown in FIGS. 1–3, the tubes 18 and 20 can be moved together and can be positioned relative to the eye 10 so that the cornea 12 of the eye substantially restricts the open ends 18.1 and 20.1 of the tubes. As indicated by the arrows 30 in FIG. 2, restriction of the tube ends retards the flow of streams of fluid from the tube ends so that fluid pressures within the tube passages 18.3 and 20.3 will increase to approach the applied pressures by which the streams of fluid are projected. As shown in the graph of FIG. 6, the fluid pressures within the passages 18.3 and 20.3 are related to the spacing T and $T_1$ (see FIGS. 1 and 2) between the open tube ends 18.1 and 20.1 and the cornea 12 so that as the open tube ends are brought close to the eye, fluid pressure P in the passage 18.3, for example, will increase at a slow rate. Then, as the space T between the tube end and the eye is further reduced, fluid pressure P in the passage 18.3 will increase more rapidly. When the space T between the tube and eye becomes very small, very slight reduction in the spacing T will cause a substantial increase in fluid pressure P. Thus where the space T is small, the fluid pressure P in the passage 18.3 becomes a very accurate measure of the space T.

It has been noted that the stream of fluid projected from the tube 18 is projected with a maximum applied pressure less than 10 millimeters of mercury which is also less than normal intraocular pressure. Thus, the stream of fluid projected from the tube 18 is projected with less force than is required for indenting or depressing the cornea 12 against the force of intraocular pressure. Accordingly, as the tube ends 18.1 and 20.1 are restricted by the cornea 12 so that fluid pressures in the passages 18.3 and 20.3 increase, the stream of fluid projected from the tube 18 will not depress the eye and the fluid pressure in the tube 18 will comprise a measure of the space T between the tube end 18.1 and an underpressed portion of the cornea 12. Thus, fluid pressure in the passage 18.3 can be said to be a gauge for locating the tube ends 18.1 and 20.1 relative to the cornea. For example, the tubes 18 and 20 can be adjusted relative to the eye 12 until fluid pressure in the tube 18, as sensed or measured by the manometer tube means 24, reaches a predetermined level, thereby to locate the tube ends 18.1 and 20.1 in a predetermined position relative to the eye.

It has also been noted that the stream of fluid projected from the tube 20 is projected with a minimum applied force greater than 60 millimeters of mercury which is also greater than intraocular pressure, this applied force being greater than intraocular pressure likely to be encountered even in an eye suffering acute glaucoma. Thus, as the tube ends 18.1 and 20.1 are positioned relative to the eye for restricting the tube ends so that fluid pressures in the tubes increase, the fluid pressure in this passage 20.3 will approach said applied pressure and the stream of fluid projected from the tube end 20.1 will have sufficient force to indent or depress the eye. In the manner described above with reference to the spacing T, the fluid pressure in the tube 20 comprises an indication of the spacing $T_1$, between the open passage end 20.1 and the cornea 12. However, since the stream of fluid projected from the tube end 20.1 is adapted to depress the cornea, the space $T_1$, will represent the distance between the tube end 20.1 and a portion 12.1 (see FIGS. 2 and 3) of the cornea which has been depressed by the stream of fluid.

As will be understood, when the space T has been established between the tube end 18.1 and an undepressed portion of the cornea 12, the location of the tube end 20.1 relative to undepressed portions of the eye has also been established. Then the space $T_1$ between the tube end 20.1 and the depressed portion 12.1 of the cornea is an indication of the extent to which the cornea has been depressed by the stream of fluid projected from the tube end 20.1. The extent to which the cornea is depressed by a known fluid pressure exerted through the passage 20.3 is then, in turn, an indication of the intraocular pressure which tends to hold the cornea fully distended.

The manometer tube 24 can be composed of any suitable material but preferably the gooseneck portion 24.1 of the tube, or the right-hand portion of the tube as illustrated, is formed of an electrically insulating material such as glass or the like. The tube 24 has apertures 24.2 and 24.3 which are arranged in spaced relation to receive terminals 32 and 34, the terminals preferably being secured within the apertures with an adhesive or other suitable means for sealing the apertures. The terminals are then adapted to be electrically interconnected by the liquid 28 within the tube if the liquid comprises an electrical conductor such as mercury. As will be understood, the terminal can be spaced so that they are adapted to be electrically interconnected by the liquid 28 only when fluid pressure in the passage 18.3 has increased to a predetermined level sufficient to cause the level 28.1 of the liquid 28 to contact the upper terminal 32. Of course, if the tube 24 is not composed of an electrically insulating material, the terminals 32 and 34 can be insulated from the tube in any conventional manner so that the terminals will be electrically interconnected only when the liquid 28 has risen to the desired level.

The manometer tube 26 can also be composed of any suitable material, but preferably the gooseneck portion 26.1 of the tube is formed of transparent material such as glass whereby the level 29.1 of the liquid 29 within the tube can be viewed. An electrically actuable valve 36, such as a conventional solenoid valve, can be disposed within the manometer tube 26 and can be adapted for preventing movement of the column of liquid 29 within the tube. That is, the valve 36 can be normally open to permit the level of the liquid 29 to rise and fall in response to fluid pressure in the passage 20.3. However, the valve is adapted to close when actuated for preventing further movement of the liquid in the tube 26, thereby to fix or maintain the level of the liquid to indicate and record the fluid pressure within the passage 20.3 at the instant the valve was actuated. Preferably, the valve is of the type which must be manually returned to open position or which incorporates a time delay means of any conventional type for holding the valve closed for a reasonably long period after actuation before it will automatically open. The valve 36 is interposed in series relation to a power source such as the battery 38 through the terminals 32 and 34 so that the valve is adapted to be actuated when the terminals are electrically interconnected by the liquid 28.

In this arrangement, the tubes 18 and 20 can be adjusted relative to the cornea 12 of an eye until the open tube ends 18.1 and 20.1 are substantially restricted so that fluid pressure in the passage 18.3 has increased to a predetermined level, thereby to locate the tube ends relative to the undepressed surface of the cornea. As will be understood, this level can be selected to be reached when the space T between the tube end 18.1 and the cornea is very small so that the desired location of the tube ends relative to the eye can be accurately achieved. Further, this level can be selected to be reached when the pressure in passage 20.3 has increased so that the stream of fluid projected from the passage 20.3 is adapted to indent or depress the cornea. The terminal 32 is positioned within the manometer tube 24 so that the level 28.1 of the liquid in that tube will be raised to contact the terminal 32 when fluid pressure in the passage 18.3 has reached said predetermined level. At the instant the liquid 28 contacts the terminal 32, the valve 36 will be automatically actuated to closed position so that further movement of the liquid in the manometer tube 26 in response to changing pressures in the passage 20.3 is prevented. Thus, the liquid level 29.1 in the tube 26 will be maintained at the level it had reached at the instant the valve was actuated and will therefore indicate the fluid pressure in the passage 20.3 at the instant the predetermined fluid pressure in the passage 18.3 had been reached. The liquid level 29.1 can then be interpreted to indicate intraocular pressure within the eye 10. Since the valve 36 will not immediately return to open position, there will be ample time for the operator of the tonometer to make an accurate reading of the liquid level 29.1.

As will be understood, the streams of fluid projected from the tube ends 18.1 and 20.1 in the tonometer 16 must both pass between the cornea 12 and the tube 18.1 through the space T so that fluid pressures in the tube passages are likely to be effected by such factors as the relative diameters of the tubes and by the relationship of the pressures in the passages. Further, mechanical variations in construction of the device 16 as well as many other factors will also play a part in determining the fluid pressures which will exist in the tube passages. Accordingly, it may be desirable to calibrate each tonometer 16 individually so that the liquid level 29.1 in the manometer tube 26 can be read against a scale, such as the scale 40, mounted adjacent the tube 26 for providing a direct reading of the intraocular pressure measured by the tonometer. As will be understood, calibration of the scale 40 can be achieved in conventional manner by testing the tonometer 16 against known standards. For example, the device 16 can be tested upon eyes of known intraocular pressure.

It will also be noted that the radius of curvature of the cornea 12 plays a part in determining the relationship between the spaces T and $T_1$, the spaces between respective tube ends and the cornea 12. For this reason, the diameters of the tubes 18 and 20 are preferably small, for example having inside diameters of two millimeters and one millimeter respectively, for limiting the significance of the corneal curvature. Alternatively, a plurality of scales similar to scale 40, etc. can be provided which are individually calibrated for eyes of different corneal curvature. Then, after measurement of the corneal curvature of a particular eye, the appropriate scale can be selectively mounted adjacent the manometer tube 26 by means of the detachable brackets 41, so that the liquid level in the tube 26 can be read directly to indicate intraocular pressure of that particular eye.

It should be understood that although the manometer tube 24 is provided with terminals 32 and 34 for actuating the valve 36, any other suitable pressure-responsive means could be associated with the tube 18 for actuating the valve 36 or other similar means in response to fluid pressure in the passage 18.3. Further, although the tubes are illustrated to show that the tube ends are located in the same plane, the tube ends 18.1 and 20.1 could be located in spaced, parallel planes if desired. It should also be noted that it may be desirable to anesthetize the eye prior to testing with the tonometer device 16 to assure a degree of immobility in the eye and to prevent discomfort to the patient.

Figure 4:
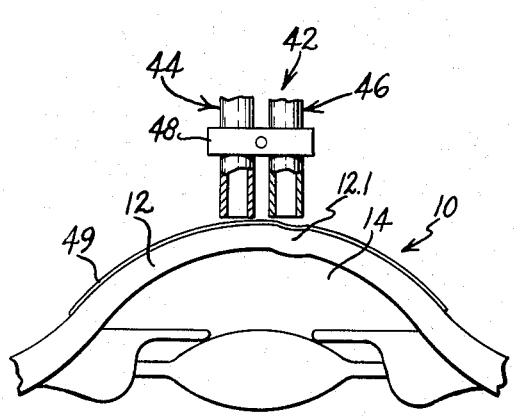
FIG. 4 is a view similar to FIG. 1 illustrating another alternative embodiment of the device of FIG. 1.

The tonometer 42 which is partially illustrated in FIG. 4 comprises an alternative embodiment of this invention. As illustrated, the device 42 incorporates a pair of tubes 44 and 46 which are similar to the tubes 18 and 20 respectively, these tubes being secured in side-by-side relation by a bracket 48. Except for the fact that the tube ends are located in side-by-side relation, the device 42 is identical to the tonometer 16 previously described. If desired, a protective place 49 such as a pliable plastic film can be disposed in coextensive superposition with the cornea of the eye for shielding the eye from abrasion due to particles which might be carried in said streams of fluid and for preventing drying of the cornea where streams of air and the like are utilized.

Figure 5:
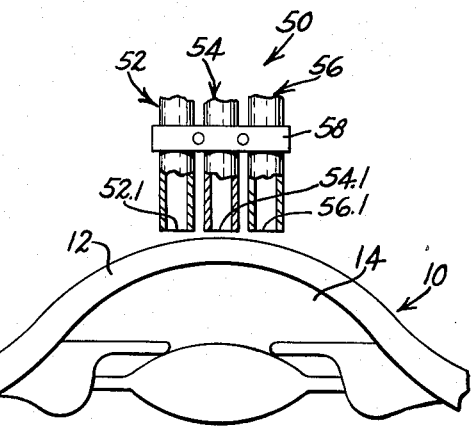
FIG. 5 is a view similar to FIG. 1 illustrating another alternative embodiment of the device of FIG. 1.

The tonometer 50 partially shown in FIG. 5 comprises another alternative embodiment of this invention. In this device, three tubes 52, 54 and 56 having respective open ends 52.1, 54.1 and 56.1 are secured together by a bracket 58 for holding the open tube ends in side-by-side linear relation. The tubes are connected to sources of compressed air (not shown) in a manner similar to that described with reference to the device 16 so that streams of air are projected from the open tube ends. The stream of air projected from the center tube 54 can be projected with an applied force so that the stream has less force than is required to indent or depress the cornea of an eye. At the same time, streams of air can be projected from the outer tubes 52 and 56 with the same relatively high, applied forces so that these streams of air are adapted to indent the cornea of an eye. The tubes are further associated with pressure responsive means of any conventional type (not shown) for measuring or sensing fluid pressures in the tubes.

In using the tonometer 50, the tubes 52, 54 and 56 can be adjusted relative to the cornea of an eye for substantially restricting the open tube ends so that the fluid pressure in the center tube is increased to a predetermined level, thereby to locate the tube ends relative to the cornea in the same manner as described above with reference to the device 16. The tubes can be further adjusted, if necessary, until fluid pressures in the outer tubes are equal, thereby to assure that the tubes are not tilted relative to a radius of the cornea. The fluid pressures in the outer tubes can then be measured as an indication of intraocular pressure as above described. Although the compressed air sources described with reference to the device 50 have been said to project streams of air from the outer tubes with relatively high applied force and to project a stream of air from the inner tube with relatively low applied force, a converse arrangement would also be satisfactory. That is, the streams of air projected from the outer passages could be projected with the relatively low applied force and the stream of air projected from the center passage could be projected with the relatively high applied force. In such an arrangement, the device could be positioned relative to the eye for restricting the open tube ends until the fluid pressures in the outer tubes were increased to the same predetermined level, thereby to assure that the tube ends were properly located relative to the eye without being tilted relative to a radius of the cornea. The fluid pressure in the center tube could then be measured as an indication of intraocular pressure.

It should be understood that although particular embodiments of the tonometer and methods of tonometry provided by this invention have been described for the purpose of illustration, this invention includes all modifications and equivalents thereof which fall within the scope of the appended claims.

Having described my invention, I claim:

1. A method of tonometry comprising as steps: projecting a stream of fluid onto an eye with selected force from a position spaced from the eye for distorting the eye against intraocular pressure, and sensing the degree of said distortion from a position spaced from the eye as an indication of said intraocular pressure.

2. A method of tonometry comprising as steps: establishing a fluid passage having an open end; disposing said open passage end with a selected spacing relative to an eye; projecting a stream of fluid with selected force from said open passage end through an intervening open space onto said eye with sufficient force for distorting said eye against its intraocular pressure; and sensing the degree of said distortion through said intervening space from a position spaced from the eye; whereby the degree of said distortion relative to said spacing and said force indicate said intraocular pressure.

3. A method of tonometry comprising as steps: establishing a plurality of fluid passages having respective open ends in predetermined spatial relation to each other; projecting streams of fluid from respective passages through the open ends thereof, said streams of fluid being projected with different forces so that a stream of fluid is projected from at least one passage with sufficient force to indent an eye and a stream of fluid is projected from at least one other passage with less force than is required for indenting an eye; adjusting the spatial relationship between the open passage ends and an eye so that the open passage ends are substantially restricted by the eye and so that the eye is indented by at least the stream of fluid projected from said one passage; measuring fluid pressure within at least said other passage for determining the spatial relationship between said passage ends and said eye; and measuring fluid pressure within at least said one passage as an indication of intraocular pressure.

4. A method of tonometry comprising as steps: establishing a pair of fluid passages having respective open ends disposed in side-by-side relation; projecting a stream of fluid from one passage through the open end thereof with sufficient force to indent an eye; projecting a stream of fluid from the other passage through the open end thereof with less force than is required for indenting an eye; positioning said open passage ends relative to an eye for substantially restricting said open passage ends so that fluid pressure within said other passage is increased to a predetermined level and so that the eye is indented by said stream of fluid projected from said one passage, thereby to locate said passage ends relative to the eye; and measuring fluid pressure within said one passage as an indication of intraocular pressure.

5. A method of tonometry comprising as steps: providing a pliable protecting film; disposing the film in coextensive superposition upon the cornea of an eye; establishing a plurality of fluid passages having respective open ends disposed in predetermined spatial relation to each other; projecting stream of fluid from respective passages through the open ends thereof, said streams of fluid being projected with different forces so that a stream of fluid is projected from at least one passage with sufficient force to indent an eye; establishing a spatial relationship between the open passage ends and the cornea of an eye covered with said film so that said open passage ends are substantially restricted and so that the film and eye are indented by at least the stream of fluid projected from said one passage; and measuring fluid pressures within said passages as an indication of intraocular pressure.

6. A method of tonometry comprising as steps: establishing a pair of fluid passages having respective open ends disposed in predetermined spatial relation to each other; projecting a stream of fluid from one passage through the open end thereof with an applied pressure greater than 60 millimeters of mercury; projecting a stream of fluid from the other passage through the open end thereof with an applied pressure less than 10 millimeters of mercury; positioning the open passage ends relative to an eye for substantially restricting said open passage ends so that fluid pressure within said other passage is increased to a predetermined level slightly less than the pressure applied to fluid within said passage and so that the eye is indented by the stream of fluid projected from said one passage, thereby to locate the passage ends relative to the eye; and measuring fluid pressure within said one passage as an indication of intraocular pressure.

7. A tonometer comprising means projecting a stream of fluid outward from the tonometer onto an eye with sufficient controlled force from a position spaced from the eye for distorting the eye against its intraocular pressure, and means for sensing the degree of said distortion from a position spaced from the eye, whereby the degree of said distortion relative to said controlled force can indicate said intraocular pressure.

8. A tonometer comprising means defining a fluid passage having an open end, means for locating said open passage end in selected spaced relation to an eye, means for projecting a stream of fluid with selected force from said open passage end through an intervening open space onto said eye for distorting said eye against its intraocular pressure, and means for sensing the degree of said distortion from a position spaced from the eye, whereby the degree of said distortion relative to said spacing of said open passage end and said force indicate said intraocular pressure.

9. A tonometer comprising means having a plurality of passages therethrough, said passages having respective open ends in closely spaced relation, means projecting stream of fluid from respective passages through the open ends thereof with different applied pressures so that said streams of fluid are adapted to exert different forces upon an eye and so that at least one stream of fluid is projected with sufficient force to indent an eye, and means for measuring fluid pressures within each of said passages, whereby, when said passage means is positioned relative to an eye so that the open passage ends are substantially restricted by the eye and so that the eye is indented by at least said one stream of fluid, fluid pressures within said passages can be measured as an indication of intraocular pressure.

10. A tonometer comprising a plurality of tube means each having an open tube end, means mounting said tube means for holding said open tube ends in predetermined, closely spaced relation, such that said open tube ends can be substantially restricted by an eye, means projecting streams of fluid from respective tube means through the open ends thereof so that a stream of fluid is projected from at least one tube means with sufficient force for indenting an eye and so that a stream of fluid is projected from at least one other tube means with less force than is required for indenting an eye, and pressure-responsive means connected to said tube means for indicating fluid pressures within respective tube means, whereby said tube means can be positioned relative to an eye for substantially restricting said open tube ends so that fluid pressures within said tube means are increased and so that the eye is indented by at least the stream of fluid projected from said one tube means, the fluid pressure within at least said other tube means can be measured for determining the relative position of said tube ends and said eye, and the fluid pressure within at least said one tube means can be measured as an indication of intraocular pressure.

11. A tonometer comprising a pair of tube means having respective open ends, means securing said tube means together for maintaining said open tube ends in side-by-side relation such that said open tube ends can be substantially restricted by an eye, means projecting a stream of fluid from one tube means through the open end thereof with sufficient force to indent an eye, means projecting a stream of fluid from the other tube means through the open end thereof with less force than is required for indenting an eye, and pressure-responsive means connected to said tube means for indicating fluid pressures within said tube means, whereby said tube means can be positioned relative to an eye for substantially restricting said open tube ends so that fluid pressure within said other tube means is increased to a predetermined level and so that the eye is indented by said stream of fluid projected from said one tube means, thereby to locate said open tube ends relative to the eye, and fluid pressure within said one tube means can be measured as an indication of intraocular pressure.

12. A tonometer comprising a pair of tube means having respective open ends, means securing said tube means together for maintaining said open tube ends in concentric relation such that said open tube ends can be substantially restricted by an eye, means projecting a stream of fluid from the inner tube means through the open end thereof with sufficient force to indent an eye, means projecting a stream of fluid through the open end thereof with less force than is required for indenting an eye, and pressure-responsive means connected to said tube means for indicating fluid pressures within said tube means, whereby said tube means can be positioned relative to an eye for substantially restricting said open tube ends so that fluid pressure within said outer tube means is increased to a predetermined level and so that the eye is indented by said stream of fluid projected from said inner tube means, thereby to locate said open tube ends relative to the eye, and fluid pressure within said inner tube means can be measured as an indication of intraocular pressure.

13. A tonometer comprising three tube means having respective open ends, means securing said tube means together for holding said open tube ends in side-by-side linear relation such that said open tube ends can be substantially restricted by an eye means projecting a stream of fluid from the center tube means through the open end thereof with sufficient force to indent an eye, means projecting streams of fluid from respective outer tube means through the open ends thereof with less force than is required for indenting an eye, and pressure-responsive means connected to said tube means for indicating fluid pressures within said tube means, whereby said tube means can be positioned relative to an eye for substantially restricting said open tube ends so that fluid pressure within said outer tube means is increased to a common predetermined level and so that the eye is indented by said stream of fluid projected from said center tube means, thereby to locate said open tube ends relative to the eye, and fluid pressure within said center tube means can be measured as an indication of intraocular pressure.

14. A tonometer comprising three tube means having respective open ends, means securing said tube means together for holding said open tube ends in side-by-side linear relation, such that said open tube ends can be substantially restricted by an eye, means projecting streams of fluid from respective outer tube means through the open ends thereof with sufficient force to indent an eye, means projecting a stream of fluid from the center tube means through the open end thereof with less force than is required for indenting an eye, and pressure-responsive means connected to said tube means for indicating fluid pressures within said tube means, whereby said tube means can be positioned relative to an eye for substantially restricting said open tube ends so that fluid pressure within said center tube means is increased to a predetermined level, so that fluid pressures within said outer tube means are increased to a common level, and so that the eye is indented by the streams of fluid projected from said outer tube means, thereby to locate said open tube ends relative to the eye, and fluid pressures within said outer tube means can be measured as an indication of intraocular pressure.

15. A tonometer comprising a pair of tube means having respective open ends, means securing said tube means together for holding said open tube ends in predetermined, closely spaced relation, means projecting a stream of fluid from one tube means through the open end thereof with sufficient force to indent an eye, means projecting a stream of fluid from the other tube means through the open end thereof with less force than is required for indenting an eye, first pressure-responsive means measuring fluid pressure within said one tube means, said first pressure-responsive means being actuable to record a fluid pressure measured by said means, second pressure-responsive means sensing a predetermined fluid pressure within said other passage, and means associated with said second pressure-responsive means adapted to actuate said first pressure-responsive means when said second pressure-responsive means measures a predetermined fluid pressure, whereby the position of said tube means can be adjusted relative to an eye for substantially restricting said open tube ends so that fluid pressure within said other tube means increases to said predetermined level, thereby to locate the open tube ends relative to the eye, and thereafter fluid pressure within said one tube means will be automatically recorded as an indication of intraocular pressure.

16. A tonometer comprising a pair of tube means having respective open ends, means securing said tube means together for holding said open tube ends in predetermined, closely-spaced relation, means projecting a stream of fluid from one tube means through the open end thereof with sufficient force to indent an eye, means projecting a stream of fluid from the other tube means through the open end thereof with less force than is required for indenting an eye, first manometer means including a column of liquid movable in a manometer tube which is connected to said one tube means so that the liquid level in the manometer tube is adapted to indicate fluid pressure within said one tube means, valve means disposed within said manometer tube which are electrically actuable for fixing the liquid level in said manometer tube, and second manometer means responsive to fluid pressure within said other tube means, said second manometer means including means adapted to close an electrical circuit for actuating said valve means when the fluid pressure sensed by said second manometer means increases to a predetermined level, whereby, when the position of said tube means is adjusted relative to an eye for substantially restricting said open tube ends so that fluid pressure within said other tube means is increased to said predetermined level and so that the stream of fluid projected from said one tube means indents the eye, said valve means will be automatically actuated for fixing the liquid level in said manometer tube, thereby to record the fluid pressure measured by said first manometer means as an indication of intraocular pressure.

17. A tonometer comprising a pair of tube means having respective open ends, means mounting said tube means for holding said open tube ends in predetermined, closely-spaced relation, means projecting a stream of fluid from one tube means through the open end thereof with sufficient force to indent an eye, means projecting a stream of fluid from the other tube means through the open end thereof with less force than is required for indenting an eye, first manometer means including a column of liquid movable in a manometer tube which is connected to said one tube means so that the liquid level in the manometer tube is adapted to indicate fluid pressure within said one said manometer tube, valve means disposed within said manometer tube which are electrically actuable for fixing tube means, said second manometer means including the liquid level in said manometer tube, second manometer means responsive to fluid pressure within said other tube means, means detachably mounting a scale adjacent means adapted to close an electrical circuit for actuating said valve means when the fluid pressure sensed by said second manometer means increases to a predetermined level, whereby, when the position of said tube means is adjusted relative to the cornea of an eye for substantially restricting said open tube ends so that fluid pressure within said other tube means is increased to said predetermined level and so that the stream of fluid projected from said one tube means indents the cornea, said valve means will be automatically actuated for fixing the liquid level in said manometer tube to record the fluid pressure measured by said first manometer means, and a plurality of scales adapted to be selectively mounted adjacent said manometer tube, each of said scales having divisions spaced to indicate intraocular pressure corresponding to liquid levels in said manometer tube for respective corneal curvatures.

18. A method of tonometry comprising as steps: projecting a stream of fluid onto an eye with selected force from a position spaced from the eye for distorting the eye against intraocular pressure, and sensing said distortion to measure said intraocular pressure.

19. A tonometer comprising means projecting fluid outward from the tonometer onto an eye with sufficient controlled force from a position spaced from the eye for distorting the eye against its intraocular pressure, and means for sensing said distortion as a measure of said intraocular pressure.

20. A method of tonometry comprising the steps of projecting fluid from a position spaced from an eye through an intervening open space onto the eye, said fluid being projected with a selected force sufficient for distorting the eye against its intraocular pressure, and sensing said distortion of the eye through an intervening space from a position spaced from the eye as an indication of said intraocular pressure.

References Cited by the Examiner
UNITED STATES PATENTS

| | | | |
|---|---|---|---|
| 2,708,928 | 5/1955 | Zenatti | 73—80 X |
| 2,986,924 | 6/1961 | Becker | 73—37.5 |

LOUIS R. PRINCE, *Primary Examiner.*

RICHARD QUEISSER, *Examiner.*